US012040523B2

(12) United States Patent
Jia et al.

(10) Patent No.: US 12,040,523 B2
(45) Date of Patent: Jul. 16, 2024

(54) RESONATOR AND FILTER

(71) Applicant: Nokia Solutions and Networks Oy, Espoo (FI)

(72) Inventors: Shouli Jia, Hangzhou (CN); Lipeng Nie, Hangzhou (CN); Yunpeng Bai, Hangzhou (CN); Hongjun Zhao, Hangzhou (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 427 days.

(21) Appl. No.: 17/600,848

(22) PCT Filed: Apr. 3, 2020

(86) PCT No.: PCT/CN2020/083340
§ 371 (c)(1),
(2) Date: Oct. 1, 2021

(87) PCT Pub. No.: WO2020/200318
PCT Pub. Date: Oct. 8, 2020

(65) Prior Publication Data

US 2022/0190455 A1 Jun. 16, 2022

(30) Foreign Application Priority Data

Apr. 4, 2019 (CN) ......................... 201910271291.0

(51) Int. Cl.
*H01P 7/06* (2006.01)
*H01P 1/207* (2006.01)

(52) U.S. Cl.
CPC ................ *H01P 1/207* (2013.01); *H01P 7/06* (2013.01)

(58) Field of Classification Search
CPC .... H01P 7/06; H01P 7/00; H01P 1/207; H01P 1/208; H01P 1/203; H01P 1/20
See application file for complete search history.

(56) References Cited

U.S. PATENT DOCUMENTS 2,527,664 A * 10/1950 Wheeler .............. H03H 7/0123 333/202
4,266,206 A 5/1981 Bedard et al.
(Continued)

FOREIGN PATENT DOCUMENTS

CN 101015118 A 8/2007
CN 200953543 Y 9/2007
(Continued)

OTHER PUBLICATIONS

"Two cavity suspended substrate filter", Google, Retrieved on Oct. 25, 2021, Webpage available at : https://www.google.co.uk/search?q=two+cavity+suspended+substrate+filter&sa=N&tbm=isch&tbo=u&source=univ&ved=0ahUKEwjH4paLrYzaAhXHPFAKHXp2AwY4ChCwBAhH&biw=1440&bih=731.
(Continued)

*Primary Examiner* — Stephen E. Jones
(74) *Attorney, Agent, or Firm* — SQUIRE PATTON BOGGS (US) LLP

(57) ABSTRACT

Example embodiments of the present disclosure provide a resonator (100) and a filter (500). The resonator (100) comprises a capacitance metal sheet (110), an inductance metal sheet (120) and a mounting metal sheet (130). The capacitance metal sheet (110) is configured to generate capacitance of the resonator (100) with a top surface (202) of a metal cavity (200) for housing the resonator (100). The inductance metal sheet (120) is configured to generate inductance of the resonator (100), which is connected to the capacitance metal sheet (110) and extends to a bottom surface (204) of the metal cavity (200). The mounting metal sheet (130) is connected to the inductance metal sheet (120) and configured to mount the resonator (100) in the metal cavity (200). The example embodiments of the present
(Continued)

disclosure can implement a resonator and a filter with high performance, small size and low cost.

17 Claims, 17 Drawing Sheets

(56) References Cited

U.S. PATENT DOCUMENTS

| | | | |
|---|---|---|---|
| 5,225,799 | A | 7/1993 | West et al. |
| 6,239,673 | B1 | 5/2001 | Wenzel et al. |
| 6,320,483 | B1 | 11/2001 | Raty et al. |
| 6,356,168 | B1 | 3/2002 | Barnett et al. |
| 6,373,351 | B1 | 4/2002 | Kubota et al. |
| 7,456,711 | B1 | 11/2008 | Goldsmith |
| 9,716,301 | B2 | 7/2017 | Park et al. |
| 2003/0206082 | A1 | 11/2003 | Chen et al. |
| 2006/0109065 | A1 | 5/2006 | Park et al. |
| 2006/0125578 | A1 | 6/2006 | Akale et al. |
| 2008/0074204 | A1 | 3/2008 | Ichikawa et al. |
| 2009/0014676 | A1 | 1/2009 | Pohn et al. |
| 2009/0058563 | A1 | 3/2009 | Seo et al. |
| 2009/0146761 | A1 | 6/2009 | Nummerdor |
| 2011/0241801 | A1 | 10/2011 | Subedi |
| 2012/0126914 | A1 | 5/2012 | Miyamoto et al. |
| 2015/0236392 | A1 | 8/2015 | Iwanaka |
| 2016/0233566 | A1 | 8/2016 | Reid |
| 2017/0093004 | A1 | 3/2017 | Lee et al. |
| 2017/0141446 | A1 | 5/2017 | Tkadlec et al. |
| 2017/0263992 | A1 | 9/2017 | Nita et al. |

FOREIGN PATENT DOCUMENTS

| | | | |
|---|---|---|---|
| CN | 101615712 | A | 12/2009 |
| CN | 102354783 | A | 2/2012 |
| CN | 202333090 | U | 7/2012 |
| CN | 103035988 | A | 4/2013 |
| CN | 103117433 | A | 5/2013 |
| CN | 105229847 | A | 1/2016 |
| CN | 105337004 | A | 2/2016 |
| CN | 106025468 | A | 10/2016 |
| CN | 106711558 | A | 5/2017 |
| CN | 106785268 | A | 5/2017 |
| CN | 107359394 | A | 11/2017 |
| CN | 107615577 | A | 1/2018 |
| CN | 207800856 | U | 8/2018 |
| CN | 208078146 | U | 11/2018 |
| DE | 202017100322 | U1 | 2/2017 |
| EP | 1143552 | A1 | 10/2001 |
| EP | 1793489 | A1 | 6/2007 |
| EP | 2254195 | A1 | 11/2010 |
| JP | 2014049867 | A | 3/2014 |
| KR | 20170019876 | A | 2/2017 |

OTHER PUBLICATIONS

Zheng et al., "Multi-Mode Bandpass Cavity Filters and Duplexer with Slot Mixed-Coupling Structure", IEEE Access, vol. 6, Oct. 25, 2017, pp. 1-9.

Skresanov et al., "Experience in developing Ka-band waveguide filter with HTS E-plane insert", International Kharkov Symposium on Physics and Engineering of Microwaves, Millimeter and Submillimeter Waves, Jun. 23-28, 2013, pp. 661-663.

Danaeian et al., "A novel wideband half-mode SIW bandpass filter based on evanescent-mode technique using complementary Z-shaped resonator", Analog Integrated Circuits and Signal Processing, vol. 98, 2018, 6 pages.

Remillard et al., "A Closed Slot-Line Resonator Filter", IEEE Microwave and Wireless Components Letters, vol. 14, No. 5, May 2004, pp. 234-236.

International Search Report and Written Opinion received for corresponding Patent Cooperation Treaty Application No. PCT/CN2018/089786, dated Feb. 20, 2019, 10 pages.

Huang, "Design and Realization of Cavity Filter", Chine Academic Journal Electronic Publishing House, 2016, 6 pages.

Office action received for corresponding Chinese Patent Application No. 201880096339.2, dated Jun. 21, 2021, 12 pages of office action and 1 page of summary available.

Decision of Rejection received for corresponding Chinese Patent Application No. 201880096339.2, dated Apr. 8, 2022, 7 pages of office action and no page of summary available.

Extended European Search Report received for corresponding European Patent Application No. 20782276.8, dated Jan. 5, 2023, 7 pages.

International Search Report and Written Opinion received for corresponding Patent Cooperation Treaty Application No. PCT/CN2020/083340, dated Jun. 29, 2020, 9 pages.

Office action received for corresponding Chinese Patent Application No. 201910271291.0, dated Feb. 22, 2021, 8 pages of office action and no page of translation available.

Allowance received for corresponding Chinese Patent Application No. 201910271291.0, dated Jul. 14, 2021, 4 pages of Allowance and no page of translation available.

Ghadiya et al., "Q-Band Cross-Coupled Dielectric Resonator Filter Using TM Mode for Satellite Application", International Journal of Microwave and Wireless Technologies, Cambridge University Press, 2018, pp. 1-7.

"Hardware Development Photos", SETI League, Retrieved on Dec. 23, 2021, Webpage available at : http://www.setileague.org/photos/hdwepix.htm.

"TWT/ TWTA Handbook", L-3 Communications Electron Technologies, Inc, Thirteenth Edition, 2007, 133 pages.

Office action received for corresponding Chinese Patent Application No. 201880096339.2, dated Nov. 26, 2021, 10 pages of office action and 1 page of summary available.

Extended European Search Report received for corresponding European Patent Application No. 18922004.9, dated Dec. 6, 2021, 10 pages.

Sagawa et al, "Geometrical Structures and Fundamental Characteristics of Microwave stepped-Impedance Resonators", IEEE Transactions on Microwave Theory and Techniques, vol. 45, No. 7, Jul. 1997, pp. 1078-1085.

European Office Action issued in corresponding European Application No. 20 782 276.8-1212 on Mar. 4, 2024.

* cited by examiner

RESONATOR AND FILTER

RELATED APPLICATION

This application claims priority to PCT Application No. PCT/CN2020/083340, filed on 3 Apr. 2020, which claims priority to Chinese Patent Application No. 201910271291.0 filed on 4 Apr. 2019, the contents of which are incorporated herein by reference in their entirety.

FIELD

Example embodiments of the present disclosure generally relate to the fields of communication and electronic circuits, and more particularly, to a resonator and a filter.

BACKGROUND

With the development of the fifth generation mobile communication technology (5G) and the Massive Multi-input Multi-output (MIMO) system, the size of a radio frequency (RF) unit in a wireless communication system becomes more and more limited. RF filters, as one of key components in the wireless communication system, are usually implemented in a RF front end of a communication device. Typically, the performance of the filter is critical for the wireless communication system.

In 5G and Massive MIMO systems, the demand for filters becomes much greater. For example, in a 64 input 64 output (64T64R) MIMO system, it is probably required to arrange totally 64 filters in a unit. Likewise, in a 256 input 256 output MIMO system, the number of filters would be as great as 256. Therefore, in an advanced wireless communication system, the demand for filters in the front end is multiple of that in traditional wireless communication systems (for example, 4G, 3G or 2G).

SUMMARY

Example embodiments of the present disclosure relate to a resonator and a filter.

In a first aspect of the present disclosure, there is provided a resonator. The resonator comprises a capacitance metal sheet configured to generate capacitance of the resonator with a top surface of a metal cavity for housing the resonator. The resonator also comprises an inductance metal sheet configured to generate inductance of the resonator. The inductance metal sheet is connected to the capacitance metal sheet and extends to a bottom surface of the metal cavity. The resonator further comprises a mounting metal sheet connected to the inductance metal sheet and configured to mount the resonator in the metal cavity.

In a second aspect of the present disclosure, there is provided a filter. The filter comprises a metal cavity and a resonator array. The resonator array is disposed in the metal cavity. The resonator array comprises at least two resonators according to the first aspect of the present disclosure.

It would be appreciated that this Summary is not intended to identify key features or essential features of the example embodiments of the present disclosure, nor is it intended to limit the scope of the present disclosure. Other features of the present disclosure will be apparent through the following description.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, same or similar reference numerals refer to same or similar elements.

DETAILED DESCRIPTION OF EMBODIMENTS

Figure 1:
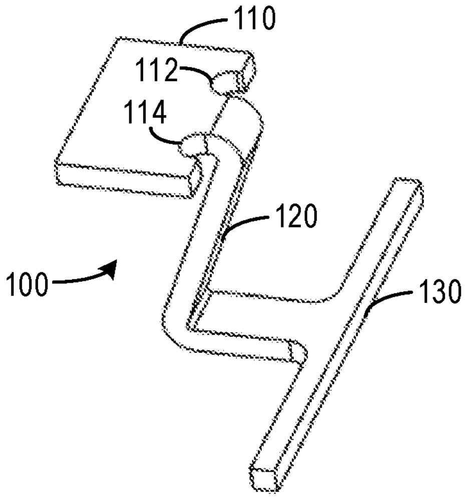
FIG. 1 illustrates a schematic diagram of a resonator according to an example embodiment of the present disclosure.

Principles and spirits of the present disclosure will now be described with reference to several example embodiments illustrated in the drawings. It should be appreciated that the description of those example embodiments is merely to enable those skilled in the art to better understand and further implement example embodiments disclosed herein and is not intended for limiting the scope disclosed herein in any manner.

Cavity filters are widely implemented in communication devices (for example, base stations) of a wireless communication system. Traditional cavity filters mainly include a cast metal housing, a lid for opening and closing the metal housing, several resonators, tuning screws twice as many as the resonators, and the like. The cost of an entire cavity filter mainly comprises a material cost and a production cost (that is, a tuning cost). However, in the scenarios of 5G and MIMO as mentioned above, the cost of traditional cavity filters is significantly increased with the growth of the number of the filters.

In addition, due to the complicated structure and the tuning manner, traditional cavity filters are of a great size. For example, in traditional cavity filters, tuning screws may be self-locking screws or nut-locking screws, which require the thickness of a metal housing (or a lid) to be greater than a certain value (for example, 6 millimeters), to ensure a sufficient tuning range.

On the other hand, ceramic filters are commonly used due to their small size and acceptable insertion loss. However, in practice, the attenuation of ceramic filters at the far end is poor due to close high modes. Therefore, it is necessary to provide a low-pass filter to cooperate with a ceramic filter, but the total insertion loss would significantly increase, because the insertion loss of the low-pass filter is approximately the same as or a half of that of the ceramic filter. In addition, the low-pass filter also results in an increased cost.

Further, as described above, in traditional cavity filters, tuning screws are used to tune the filters. For example, for ceramic filters, it is typical to drill holes on a surface of a filter for tuning the filter. In an improvement thereof, some traditional technologies tune the operation frequency of a filter by deforming a lid above resonators, but the coupling between resonators cannot be tuned in this way.

In other traditional technologies, the resonant frequency of a resonator and the coupling between resonators are tuned by deforming metal petals disposed on heads of the resonators. However, a great deformation is needed to ensure a sufficient tuning range, and in a long-term application scenario, the metal petals may be gradually restored by themselves. Moreover, if these metal petals are provided, the Q value and the power handling capability of the resonators will drop substantially.

In still other traditional technologies, the metal petals are designed on the lid of the filter, and the resonant frequency of a resonator and the coupling between resonators are tuned by deforming the metal petals on the lid. However, great slots are required for the metal petals in this scheme, causing a risk of electromagnetic compatibility (EMC) performance due to an electromagnetic leakage.

In view of the above and other potential problems of traditional solutions, example embodiments of the present disclosure provide a novel resonator and a filter comprising such resonators. In some example embodiments, the resonator can be formed by a metal sheet and thus is more compact in structure, thereby reducing the size of a filter consists of such resonators. In addition, the tuning of the resonator formed by a metal sheet does not need to use tuning screws, and thus the thickness of a metal cavity of the filter may be decreased, resulting in a further reduction in the size of the filter.

On the other hand, forming a resonator from a metal sheet and thus omitting tuning screws may reduce the material cost of the filter. Additionally, an array of a plurality of resonators may be formed by a single metal sheet, thereby simplifying assembling of the filter. Moreover, through simulation and testing, the filter according to an example embodiment of the present disclosure is not worse or even better than traditional cavity filters in terms of insertion loss performance, attenuation performance, and the like. Several example embodiments of the present disclosure will be described below in detail with reference to the drawings.

FIG. 1 illustrates a schematic diagram of a resonator 100 according to an example embodiment of the present disclosure. As shown in FIG. 1, the resonator 100 includes a capacitance metal sheet 110, an inductance metal sheet 120 and a mounting metal sheet 130. The inductance metal sheet 120 is connected to the capacitance metal sheet 110, and the mounting metal sheet 130 is connected to the inductance metal sheet 120. In the shown example embodiment, the resonator 100 as a whole can be substantially "Z"-shaped, for example, having a large and flat capacitance metal sheet 110, an elongated inductance metal sheet 120 and an elongated mounting metal sheet 130. Therefore, as used herein, the resonator 100 may sometimes be referred to as a Z-shaped metal sheet structure. However, it would be appreciated that the resonator 100 according to an example embodiment of the present disclosure is not limited to any particular metal sheet shape.

In addition, it is noted that the resonator 100 may have a three-dimensional shape as illustrated in FIG. 1. For example, the capacitance metal sheet 110, the inductance metal sheet 120 and the mounting metal sheet 130 of the resonator 100 can be formed in a three-dimensional structure rather than formed in a two-dimensional surface. Accordingly, the resonator 100 in a three-dimensional shape differs from a resonator that only has two dimensions, such as microstrip resonators, for example formed in a surface of a dielectric substrate.

In some example embodiments, the capacitance metal sheet 110, the inductance metal sheet 120 and the mounting metal sheet 130 can be integrally formed, that is, formed as a single metal sheet. Such a single integrally formed metal sheet may be advantageously manufactured using a developed sheet metal processing technology. In other example embodiments, the capacitance metal sheet 110, the inductance metal sheet 120 and the mounting metal sheet 130 may be formed separately, and connected with each other in any appropriate connecting manner (for example, by soldering). The function and role of each metal sheet of the resonator 100 will be described below with reference to FIG. 2.

Figure 2A:
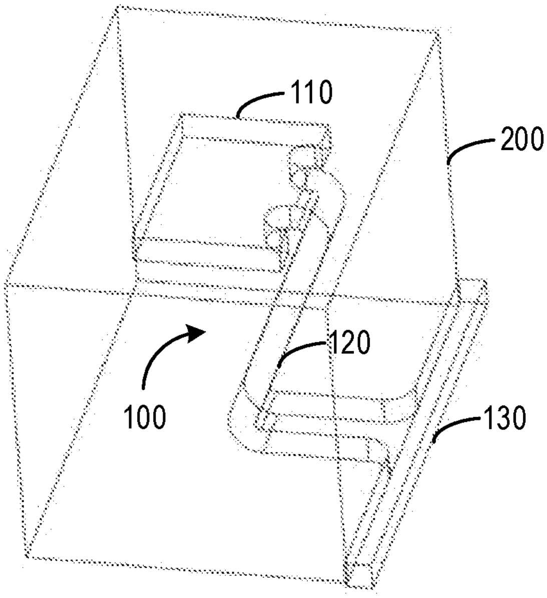
FIG. 2A illustrates a perspective view of a combination of a resonator and a metal cavity according to an example embodiment of the present disclosure.

FIG. 2A illustrates a perspective view of a combination of the resonator 100 and a metal cavity 200 according to an example embodiment of the present disclosure. As shown in FIG. 2A, the resonator 100 is disposed within the metal cavity 200, so as to form a filter, such as a cavity filter, together with other resonators (not shown in FIG. 2A) and the metal cavity 200. It would be appreciated that, although the metal cavity 200 is shown to have a particular shape (for example, a cuboid shape) in FIG. 2A, in other example embodiments, the metal cavity 200 may have any shape suitable for serving as a filter housing.

Figure 2B:
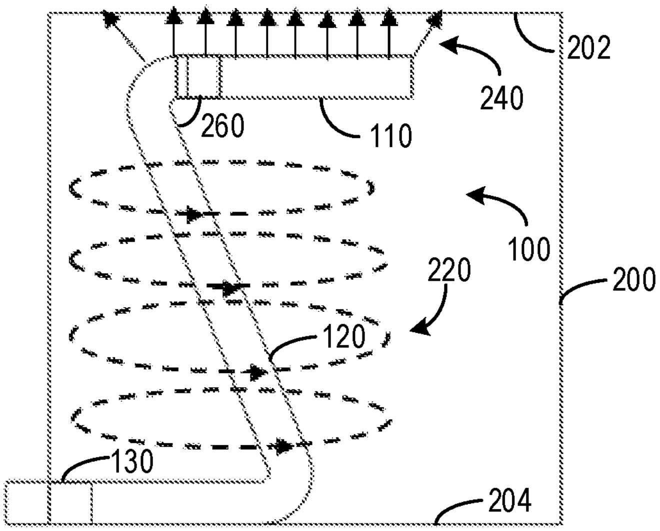
FIG. 2B illustrates a schematic diagram of electromagnetic field distribution of a combination of a resonator and a metal cavity according to an example embodiment of the present disclosure.

FIG. 2B illustrates a schematic diagram of electromagnetic field distribution of the combination of the resonator 100 and the metal cavity 200 according to an example embodiment of the present disclosure. As shown in FIG. 2B, the metal cavity 200 may have a top surface 202 and a bottom surface 204. The capacitance metal sheet 110 of the resonator 100 generates capacitance of the resonator 100 together with the top surface 202 of the metal cavity 200. For example, the electric field distribution in the capacitance is schematically shown in FIG. 2B by an electric field 240.

As mentioned above, the capacitance metal sheet 110 may be of a flat shape, which is helpful for generating the capacitance with the top surface 202 of the metal cavity 200. For example, as shown in FIGS. 1 and 2, the capacitance metal sheet 110 may have a substantially rectangular shape. In other words, the surface of the capacitance metal sheet 110 which faces the top surface 202 of the metal cavity 200 may be a rectangle. The larger the area of the rectangle is, the greater the capacitance formed between the capacitance metal sheet 110 and the top surface 202 of the metal cavity 200 is. In some example embodiments, the capacitance metal sheet 110 may be substantially parallel to the top surface 202 of the metal cavity 200, and thus can efficiently form the capacitance with the top surface 202. However, it would be appreciated that the capacitance metal sheet 110 may be of any appropriate shape and orientation so long as it achieves its function and role of generating the capacitance.

As shown in FIGS. 2A and 2B, the inductance metal sheet 120 of the resonator 100 extends to the bottom surface 204 of the metal cavity 200, and is configured to generate inductance of the resonator 100. For example, the magnetic field distribution around the inductance is schematically shown in FIG. 2B by a magnetic field 220. The resonant frequency of the resonator 100 therefore may be determined by the capacitance generated by the capacitance metal sheet 110 and the inductance generated by the inductance metal sheet 120. As mentioned above, the inductance metal sheet 120 can be of an elongated shape, such as a strip of metal sheet, namely a long and narrow piece of metal sheet, which is helpful for generating the inductance. More generally, the length of the inductance metal sheet 120 may be greater than the width thereof. For example, the longer the inductance metal sheet 120 is, the greater the generated inductance is.

As shown in FIG. 2B, in some example embodiments, there may be an angle 260 between the inductance metal sheet 120 and the capacitance metal sheet 110. This arrangement can effectively lengthen the inductance metal sheet 120. The less the magnitude of the angle 260 is, the longer the inductance metal sheet 120 is. Alternatively, the inductance metal sheet 120 may extends substantially perpendicular to the capacitance metal sheet 110. In other words, the angle 260 may be approximately 90 degrees in magnitude. This is advantageous for the resonator 100 to have a compact structure and a low cost. In some other example embodiments, the angle 260 may be an obtuse angle, that is, greater than 90 degrees in magnitude. However, it would be understood that the inductance metal sheet 120 can be of any appropriate shape and orientation so long as it achieves the function and role of generating the inductance.

The mounting metal sheet 130 is configured to mount the resonator 100 within the metal cavity 200. In some example embodiments, the mounting metal sheet 130 may mount the resonator 100 on the bottom surface 204 of the metal cavity 200. In some other embodiments, the mounting metal sheet 130 may mount the resonator 100 at any appropriate position of the metal cavity 200. In the example embodiment as shown, the mounting metal sheet 130 can have a shape of a strip, which is helpful for connecting a plurality of resonators to form a resonator array, for example. However, it would be appreciated that, in other example embodiments, the mounting metal sheet 130 may be of any appropriate shape so long as it achieves the function and role of mounting the resonator 100.

In addition, as shown in FIGS. 1 and 2, the capacitance metal sheet 110 may include notches 112 and 114 at two sides of a joint between the capacitance metal sheet 110 and the inductance metal sheet 120. By providing the notches 112 and 114, the effective length of the inductance metal sheet 120 is increased, thereby reducing the resonant frequency of the resonator 100. Moreover, the notches 112 and 114 enable easy manufacture of the capacitance metal sheet 110 or the single metal sheet forming the resonator 100, for example, using a stamping technology. However, it would be appreciated that, in other example embodiments, the capacitance metal sheet 110 may not have notches 112 and 114, or the notches may be provided at other appropriate positions. Additionally, although the notches 112 and 114 are shown in a particular number and shape, in other example embodiments, the notches may have any appropriate number and shape.

As seen in FIG. 2B and noted above, in the metal cavity 200, the electric field 240 is mainly distributed in a gap between the capacitance metal sheet 110 and the top surface 202, and the magnetic field 220 is mainly distributed around the inductance metal sheet 120. Therefore, the distribution of the electromagnetic field can be led to a desired region by designing the structure (for example, the shape) of each metal sheet of the resonator 100. An approach of increasing the capacitance of the resonator 100 will be described below with reference to FIGS. 3A-3D.

Figure 3A:
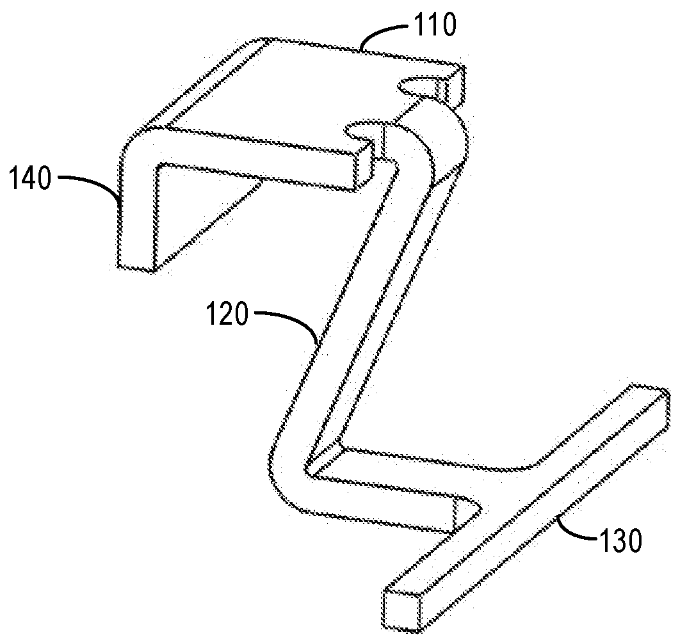
FIG. 3A illustrates a perspective view of a resonator with a metal bend in the front of a capacitance metal sheet according to an example embodiment of the present disclosure.
Figure 3B:
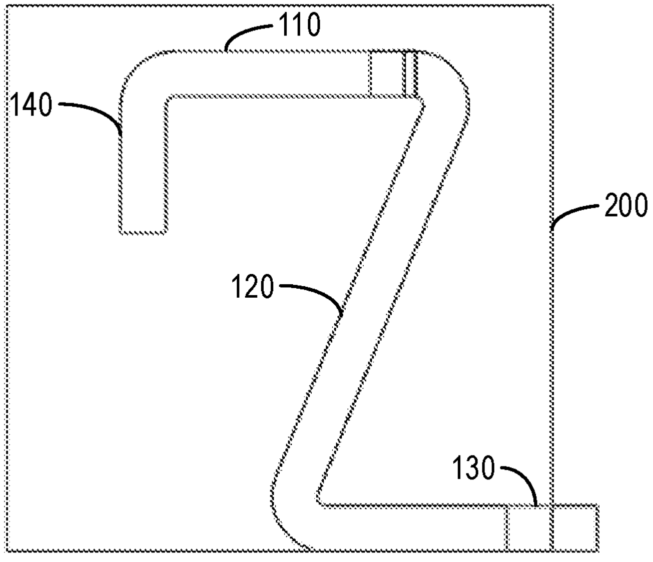
FIG. 3B illustrates a side view of the resonator with the metal bend in the front of the capacitance metal sheet according to an example embodiment of the present disclosure.

FIG. 3A illustrates a perspective view of the resonator 100 with a metal bend 140 in the front of the capacitance metal sheet 110 according to an example embodiment of the present disclosure. FIG. 3B illustrates a corresponding side view. As shown in FIGS. 3A and 3B, the metal bend 140 extends from the front edge of the capacitance metal sheet 110 towards the bottom surface 204 of the metal cavity 200. Alternatively or additionally, the metal bend 140 may be arranged to extend substantially perpendicular to the capacitance metal sheet 110. With the metal bend 140, the capacitance of the resonator 100 can be increased.

Figure 3C:
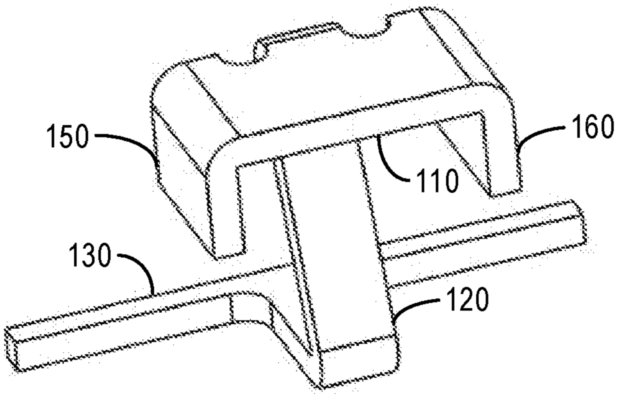
FIG. 3C illustrates a perspective view of a resonator with metal bends at two sides of a capacitance metal sheet according to an example embodiment of the present disclosure.
Figure 3D:
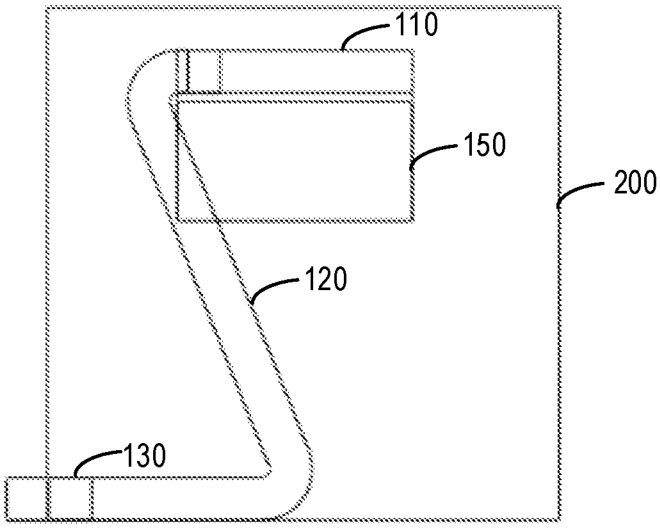
FIG. 3D illustrates a side view of the resonator with the metal bends at the two sides of the capacitance metal sheet according to an example embodiment of the present disclosure.

FIG. 3C illustrates a perspective view of the resonator 100 with metal bends 150, 160 at two sides of the capacitance metal sheet 110, according to an example embodiment of the present disclosure. FIG. 3D illustrates a corresponding side view. As shown in FIGS. 3C and 3D, the metal bends 150 and 160 extend from edges at two sides of the capacitance metal sheet 110 to the bottom surface 204 of the metal cavity 200, respectively. Alternatively or additionally, the metal bends 150 and 160 may be arranged to extend substantially perpendicular to the capacitance metal sheet 110. With the metal bends 150 and 160, the capacitance of the resonator 100 can also be increased.

Figure 4A:
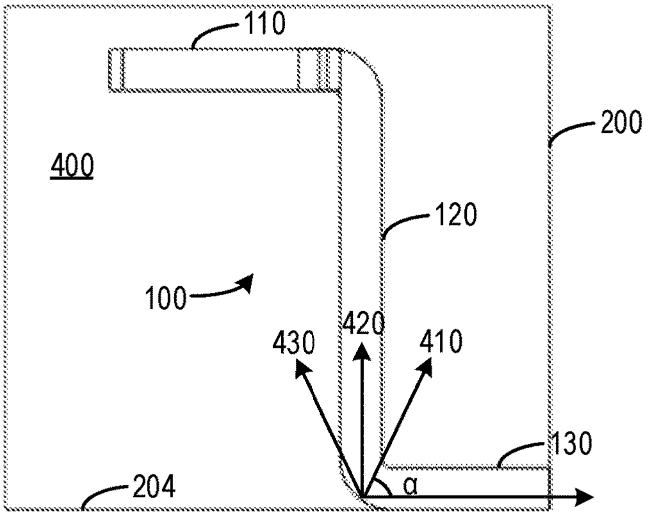
FIG. 4A illustrates a schematic diagram of adjusting an angle between an inductance metal sheet and a bottom surface of a metal cavity within a reference plane perpendicular to a capacitance metal sheet and the inductance metal sheet according to an example embodiment of the present disclosure.

In addition, the resonant frequency of the resonator 100 may be adjusted by rotating the resonator 100 towards a particular direction. FIG. 4A illustrates a schematic diagram of adjusting an angle (which is also referred to as a rotation angle) a between the inductance metal sheet 120 and the bottom surface 204 of the metal cavity 200 within a reference plane 400 perpendicular to the capacitance metal sheet 110 and the inductance metal sheet 120, according to an example embodiment of the present disclosure. As shown in FIG. 4A, the angle $\alpha$ between the inductance metal sheet 120 and the bottom surface 204 of the metal cavity 200 within the plane 400 where this schematic diagram is located can be used to adjust the resonant frequency of the resonator 100. This is detailed below with reference to a simulation graph of FIG. 4B.

Figure 4B:
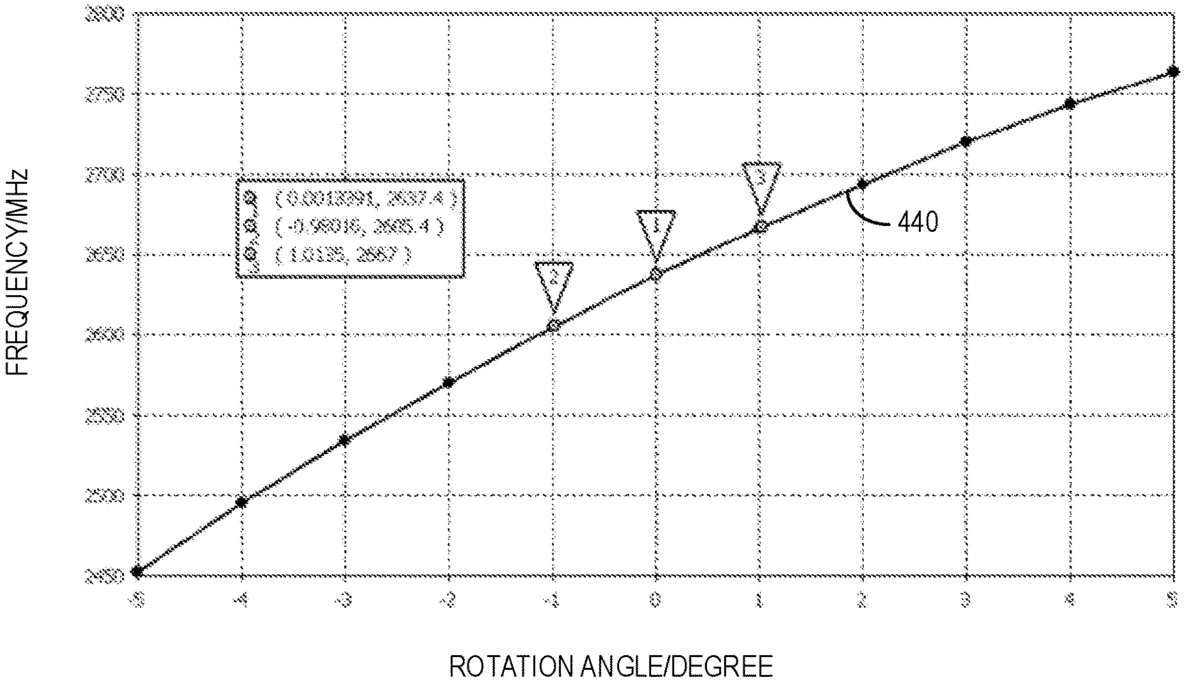
FIG. 4B illustrates a simulation graph of a resonant frequency of the resonator varying with the angle adjusted as shown in FIG. 4A according to an example embodiment of the present disclosure.

FIG. 4B illustrates a simulation graph of the resonant frequency of the resonator 100 varying with the angle $\alpha$ adjusted as shown in FIG. 4A, according to an example embodiment of the present disclosure. In FIG. 4B, the horizontal axis represents the magnitude of the rotation angle $\alpha$ relative to the vertical direction in degree, and the vertical axis represents the resonant frequency of the resonator 100 in megahertz (MHz). As shown by a changing curve 440 in FIG. 4B, at the operation frequency (for example, 2600 MHz) of the resonator 100, if the angle $\alpha$ is changed by one degree, the resonant frequency is approximately changed by 30 MHz. Typically, during tuning of a filter, a tuning range of 100 MHz can cover a design tolerance, and therefore, a change of ±2 degrees in the angle $\alpha$ may be sufficient for tuning the resonant frequency of the resonator 100, which implies that the tuning of the resonator 100 can be easily implemented.

Figure 5A:
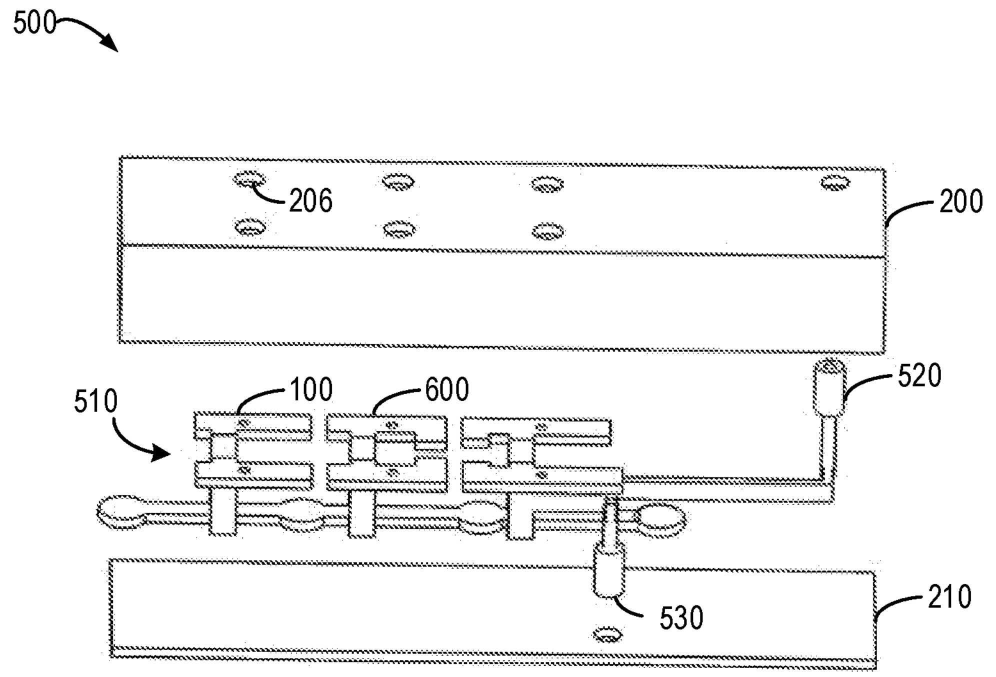
FIG. 5A illustrates a schematic diagram of a filter according to an example embodiment of the present disclosure.

FIG. 5A illustrates a schematic diagram of a filter 500 according to an example embodiment of the present disclosure. As shown in FIG. 5A, the filter 500 includes the metal cavity 200 and a resonator array 510. The resonator array 510 is disposed within the metal cavity 200, for example, by soldering or securing through a screw. The resonator array 510 may include at least two resonators 100 and 600. In the example as shown, the resonator array 510 includes six resonators. The resonators in the resonator array 510 may each have the resonator structure as described above with reference to FIGS. 1-4.

In addition, the filter 500 may also include an input port 520 for inputting a signal (for example, a RF signal), and an output port 530 for outputting a signal. The filter 500 may further include a lid 210 adapted to close and open the metal cavity 200 for allowing the resonator array 510 to be mounted into the metal cavity 200. The filter 500 may additionally include a tuning hole 206 on the top surface 202 of the metal cavity 200, for tuning a resonator in the resonator array 510, for example, the resonator 100.

Figure 5B:
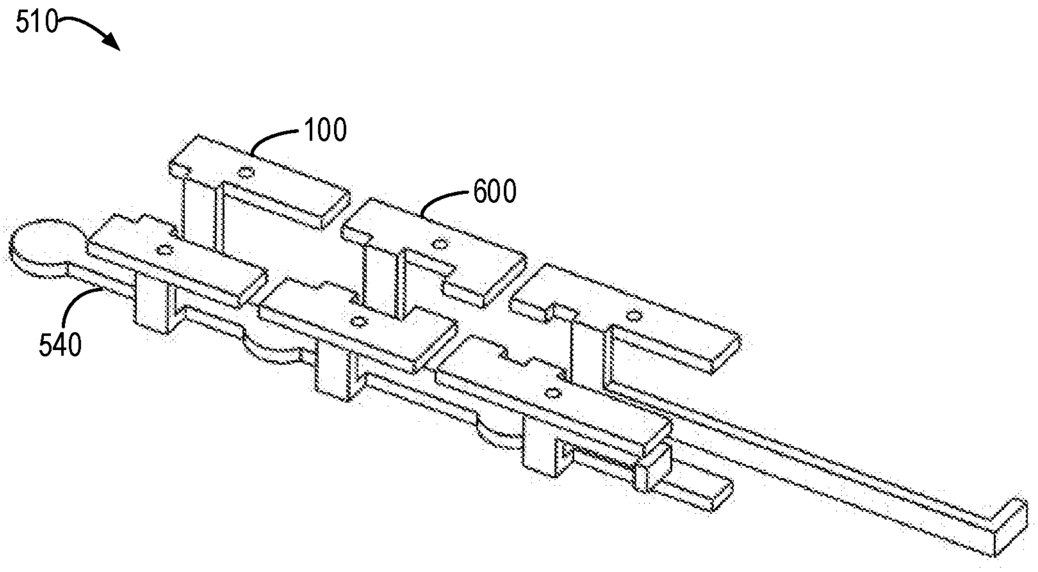
FIG. 5B illustrates a schematic diagram of a resonator array according to an example embodiment of the present disclosure.

FIG. 5B illustrates a schematic diagram of the resonator array 510 according to an example embodiment of the present disclosure. As shown in FIG. 5B, the resonator array 510 as a whole can be formed by a single metal sheet. As such, it is convenient to manufacture the resonator array 510, and mounting of individual resonators is avoided. Alternatively, the resonator array 510 may be divided into several parts formed separately, or each resonator may be formed individually, to improve flexibility of the resonator array 510. In some example embodiments, the first mounting metal sheet of the first resonator 100 and the second mounting metal sheet of the second resonator 600 may be integrally formed as a single mounting metal sheet 540. The single mounting metal sheet 540 may also be referred to as a common mounting metal sheet 540 for a plurality of resonators, which allows the plurality of resonators in the resonator array 510 to be mounted in the metal cavity 200 in one mounting operation. Several example arrangements of the common mounting metal sheet 540 relative to the resonators will be described below with reference to FIGS. 6A and 6B.

Figure 6A:
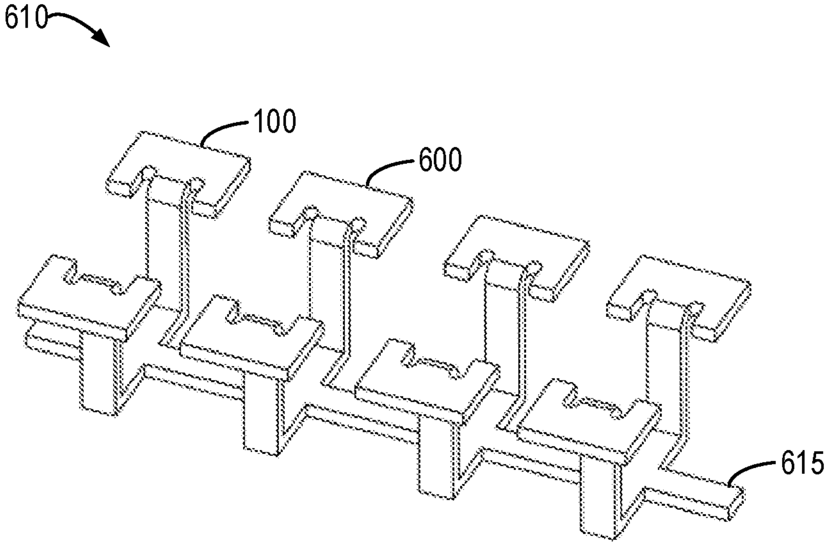
FIG. 6A illustrates a schematic diagram of a resonator array in which resonators are disposed at two sides of a common mounting metal sheet according to an example embodiment of the present disclosure.

FIG. 6A illustrates a schematic diagram of a resonator array 610 in which resonators are disposed at two sides of a common mounting metal sheet 615, according to an example embodiment of the present disclosure. As shown in FIG. 6A, the resonator array 610 consists of eight resonators including the resonators 100 and 600. The eight resonators share the common mounting metal sheet 615 and are distributed equally at two sides of the common mounting metal sheet 615. This arrangement can make full use of the space within the metal cavity 200, thereby reducing the size of the filter 500. It would be appreciated that, in other example embodiments, the resonator array 610 may include any appropriate number of resonators, and these resonators may be arranged in any manner relative to the common mounting metal sheet 615.

Figure 6B:
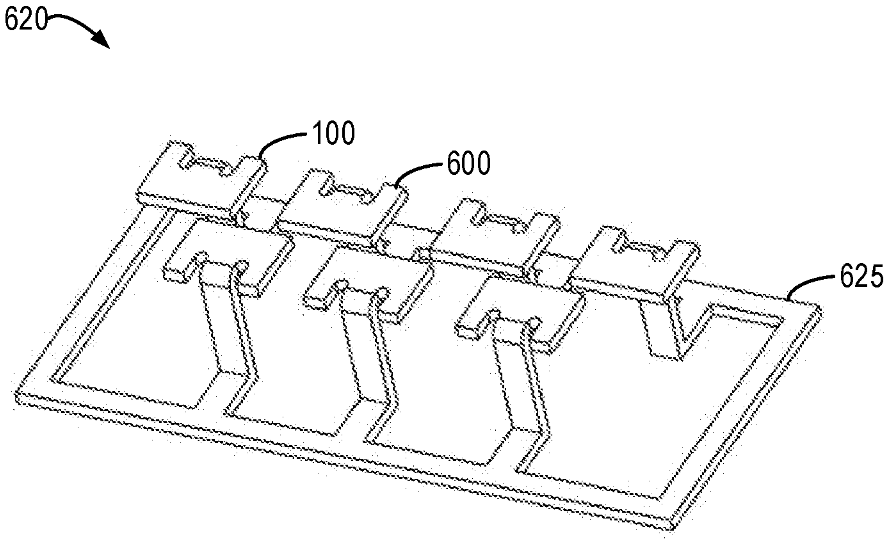
FIG. 6B illustrates a schematic diagram of a resonator array in which a common mounting metal sheet surrounds resonators according to an example embodiment of the present disclosure.

FIG. 6B illustrates a schematic diagram of a resonator array 620 in which a common mounting metal sheet 625 is around resonators, according to an example embodiment of the present disclosure. As shown in FIG. 6B, the resonator array 620 consists of seven resonators including the resonators 100 and 600. The seven resonators share the common mounting metal sheet 625 which surrounds the seven resonators. This arrangement can also make full use of the space within the metal cavity 200, thereby reducing the size of the filter 500. In addition, the space in the middle of the metal cavity 200 may not be occupied by the common mounting metal sheet 625 in this arrangement. It would be appreciated that, in other example embodiments, the resonator array 620 may include any appropriate number of resonators, and the resonators may be arranged in any manner relative to the common mounting metal sheet 625.

Figure 7:
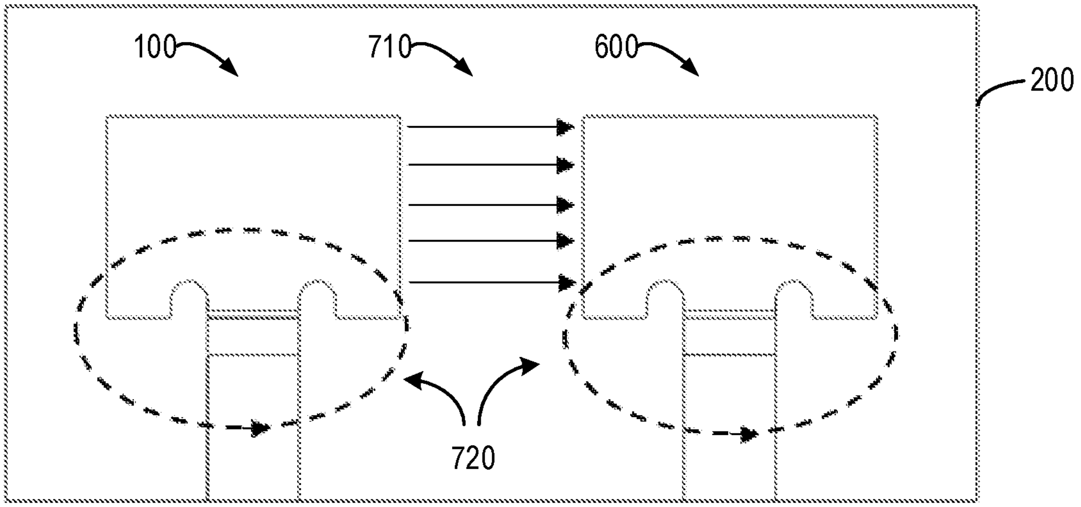
FIG. 7 illustrates a schematic diagram of electric coupling and magnetic coupling between two resonators according to an example embodiment of the present disclosure.

FIG. 7 illustrates a schematic diagram of electric coupling 710 and magnetic coupling 720 between two resonators 100 and 600, according to an example embodiment of the present disclosure. As shown in FIG. 7, the electric coupling 710 between the first resonator 100 and the second resonator 600 is mainly present between their respective first capacitance metal sheet 110 and second capacitance metal sheet 610, and the magnetic coupling 720 between the first resonator 100 and the second resonator 600 mainly exists between their respective first inductance metal sheet 120 and second inductance metal sheet 620.

The total coupling (for example, the total electromagnetic coupling) between the first resonator 100 and the second resonator 600 may be equal to a vector sum of the electric coupling 710 and the magnetic coupling 720. If the electric coupling 710 is much greater in magnitude than the magnetic coupling 720, the coupling between the first resonator 100 and the second resonator 600 is electric coupling. If the magnetic coupling 720 is far greater in magnitude than the electric coupling 710, the coupling between the first resonator 100 and the second resonator 600 is magnetic coupling. If the electric coupling 710 is approximately equal to the magnetic coupling 720 in magnitude, the coupling between the first resonator 100 and the second resonator 600 is zero, namely, there is substantially no coupling between the two resonators. There are various ways to enhance the electromagnetic coupling strength between the first resonator 100 and the second resonator 600, which will be described below in detail with reference to FIGS. 8-11.

Figure 8A:
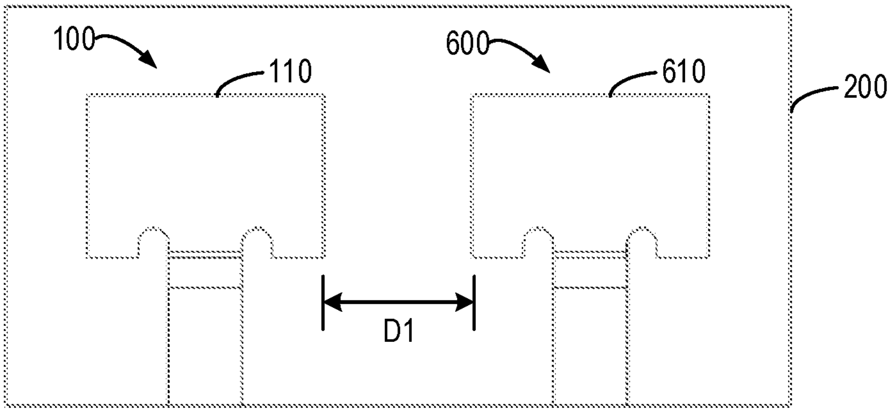
FIG. 8A illustrates a schematic diagram of adjusting a distance between capacitance metal sheets of two resonators according to an example embodiment of the present disclosure.

In some example embodiments, the electric coupling coefficient between the first resonator 100 and the second resonator 600 is adjustable. For example, the distance between the capacitance metal sheet 110 of the first resonator 100 and the capacitance metal sheet 610 of the second resonator 600 may be used to adjust the electric coupling coefficient. FIG. 8A illustrates a schematic diagram of adjusting the distance D1 between capacitance metal sheets 110 and 610 of the two resonators 100 and 600, according to an example embodiment of the present disclosure. As shown in FIG. 8A, the distance between the capacitance metal sheet 110 of the first resonator 100 and the capacitance metal sheet 610 of the second resonator 600 is represented by D1, and the electric coupling coefficient between the two resonators 100 and 600 is tuned by adjusting the distance D1. This will be detailed below with reference to a simulation graph of FIG. 8B.

Figure 8B:
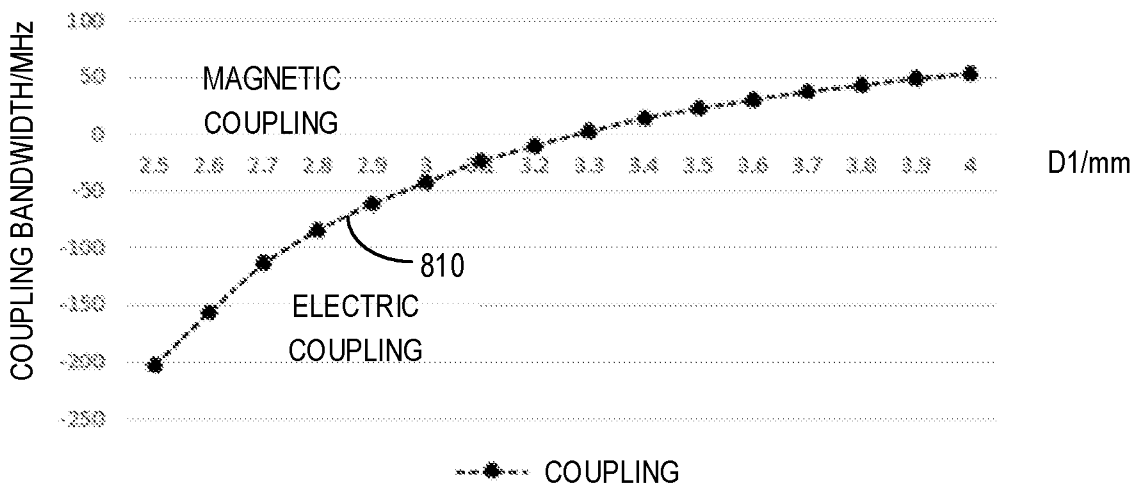
FIG. 8B illustrates a simulation graph of a coupling bandwidth varying with the distance adjusted as shown in FIG. 8A according to an example embodiment of the present disclosure.

FIG. 8B illustrates a simulation graph of a coupling bandwidth varying with the distance D1 adjusted as shown in FIG. 8A, according to an example embodiment of the present disclosure. In FIG. 8B, the horizontal axis represents the magnitude of the distance D1 in millimeter (mm), and the vertical axis represents the coupling bandwidth (the coupling coefficient×the frequency) between the first resonator 100 and the second resonator 600. Since the coupling coefficient is dimensionless, the unit of the coupling bandwidth is the unit of the frequency, megahertz (MHz). The coupling bandwidth can represent the coupling strength between two resonators at a certain frequency. As shown by a changing curve 810 in FIG. 8B, in case the distance D1 is increased, the electric coupling between the first resonator 100 and the second resonator 600 is weakened. In addition, it is noted that, when the distance D1 is of a certain value (about 3.3 mm in this example embodiment), the strength of the electric coupling is substantially equal to the strength of the magnetic coupling. Such a characteristic can be considered and utilized in the design of the filter 500.

Figure 9A:
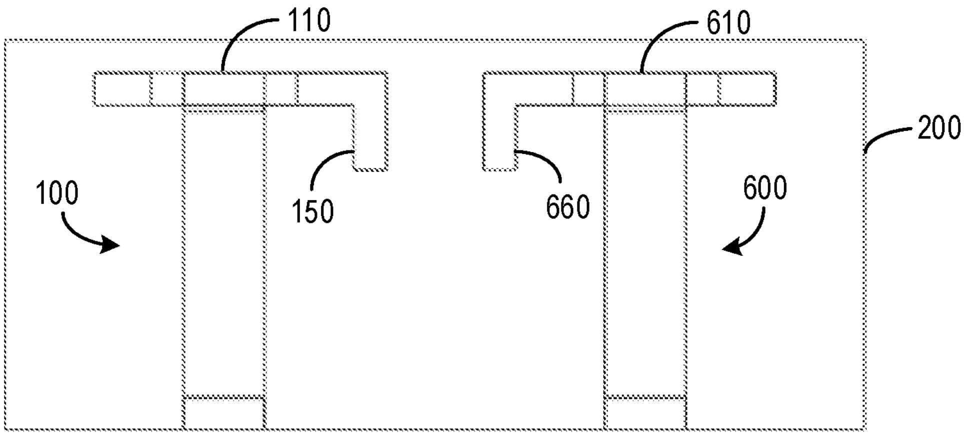
FIG. 9A illustrates a schematic diagram of two resonators with metal bends at ends of capacitance metal sheets in proximity to each other according to an example embodiment of the present disclosure.

FIG. 9A illustrates a schematic diagram of the two resonators 100 and 600 with metal bends 150, 660 at ends of the capacitance metal sheets 110 and 610 in proximity to each other, according to an example embodiment of the present disclosure. As shown in FIG. 9A, at positions close to each other of the adjacent capacitance metal sheets 110 and 610 of the first resonator 100 and the second resonator 600, the first capacitance metal sheet 110 may extend downwards to form the metal bend 150, and the second capacitance metal sheet 610 may extend downwards to form the metal bend 660. With the effect of the metal bends 150 and 660, the electric coupling between the two resonators 100 and 600 is strengthened, thereby increasing the operation bandwidth of the filter 500.

Figure 9B:
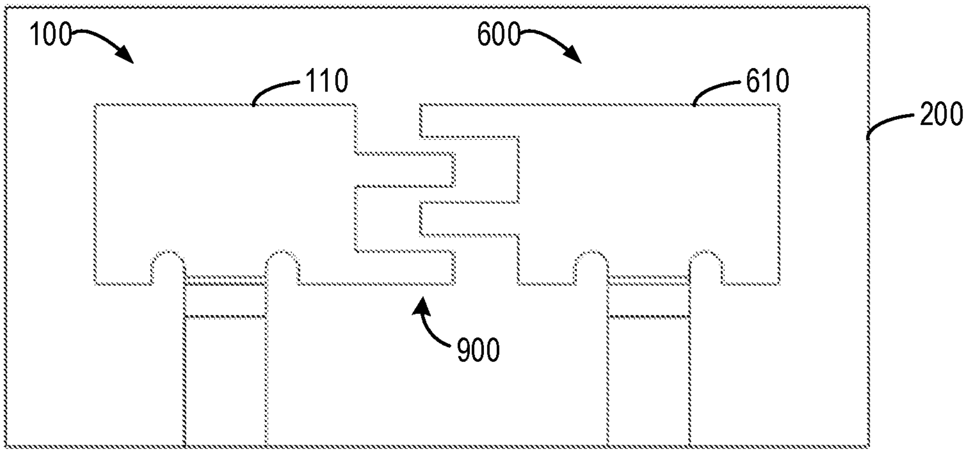
FIG. 9B illustrates a schematic diagram of two resonators with an interdigital structure formed between capacitance metal sheets according to an example embodiment of the present disclosure.

FIG. 9B illustrates a schematic diagram of the two resonators 100 and 600 with an interdigital structure 900 formed between the capacitance metal sheets 110 and 660, according to an example embodiment of the present disclosure. As shown in FIG. 9B, at positions close to each other of the adjacent two capacitance metal sheets 110 and 610 of the first resonator 100 and the second resonator 600, the interdigital structure 900 may be formed between the first capacitance metal sheet 110 and the second capacitance metal sheet 610. With the effect of the interdigital structure 900, the electric coupling between the two resonators 100 and 600 can be strengthened, thereby increasing the operation bandwidth of the filter 500.

Figure 10A:
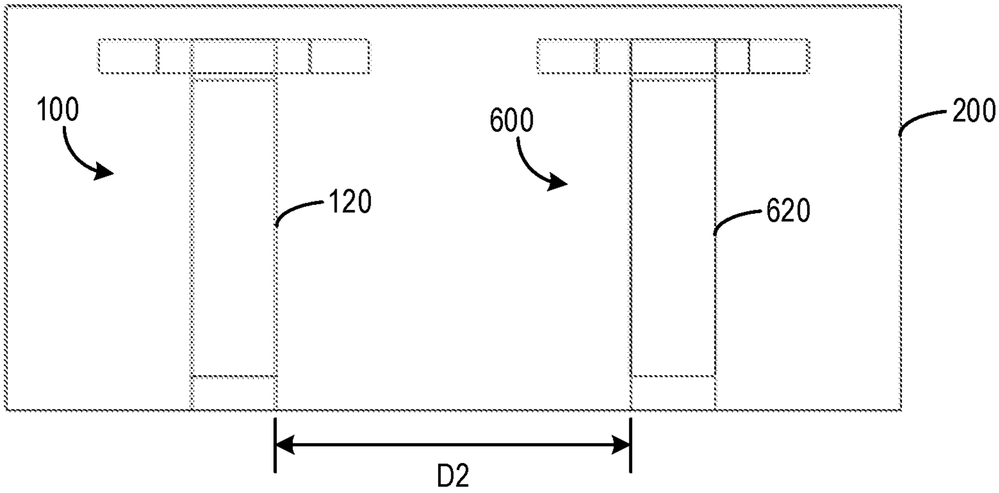
FIG. 10A illustrates a schematic diagram of adjusting a distance between inductance metal sheets of two resonators according to an example embodiment of the present disclosure.

Besides the electric coupling, in some example embodiments, the magnetic coupling coefficient between the first resonator 100 and the second resonator 600 is also adjustable. For example, the distance between the inductance metal sheet 120 of the first resonator 100 and the inductance metal sheet 620 of the second resonator 600 may be used to adjust the magnetic coupling coefficient. FIG. 10A illustrates a schematic diagram of adjusting the distance D2 between the inductance metal sheets 120 and 620 of the two resonators 100 and 600, according to an example embodiment of the present disclosure. As shown in FIG. 10A, the distance between the inductance metal sheet 120 of the first resonator 100 and the inductance metal sheet 620 of the second resonator 600 is represented by D2, and the magnetic coupling coefficient between the two resonators 100 and 600 is tuned by adjusting the distance D2. This is further described below with reference to a simulation graph of FIG. 10B.

Figure 10B:
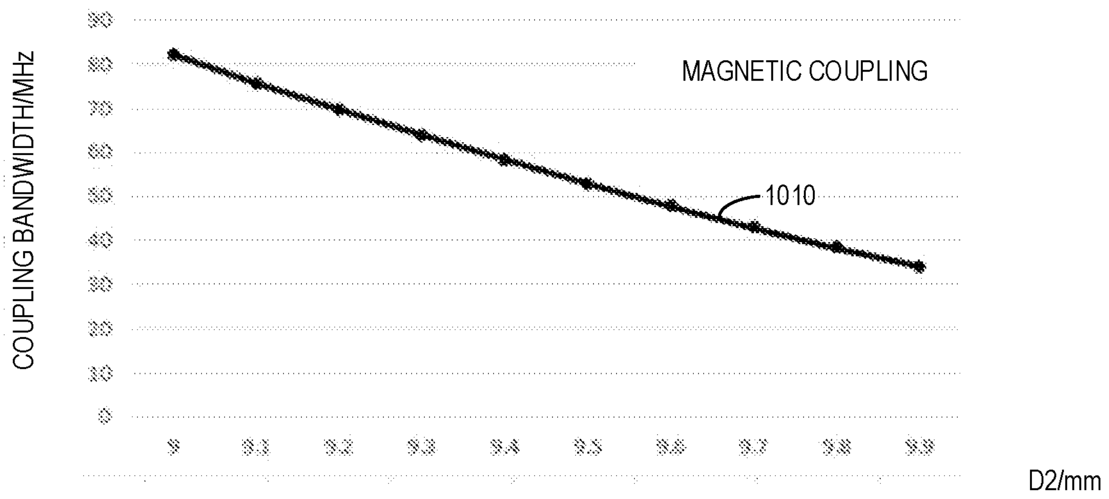
FIG. 10B illustrates a simulation graph of a coupling bandwidth varying with the distance adjusted as shown in FIG. 10A according to an example embodiment of the present disclosure.

FIG. 10B illustrates a simulation graph of a coupling bandwidth varying with the distance D2 adjusted as shown in FIG. 10A, according to an example embodiment of the present disclosure. In FIG. 10B, the horizontal axis represents the magnitude of the distance D2 in millimeter (mm), and the vertical axis represents a coupling bandwidth (the coupling coefficient×the frequency) between the first resonator 100 and the second resonator 600. Since the coupling coefficient is dimensionless, the unit of the coupling bandwidth is the unit of the frequency, megahertz (MHz). The coupling bandwidth can represent the strength of coupling between two resonators at a certain frequency. As shown by a changing curve 1010 in FIG. 10B, in case the distance D2 is increased, the magnetic coupling between the first resonator 100 and the second resonator 600 is weakened.

Figure 11A:
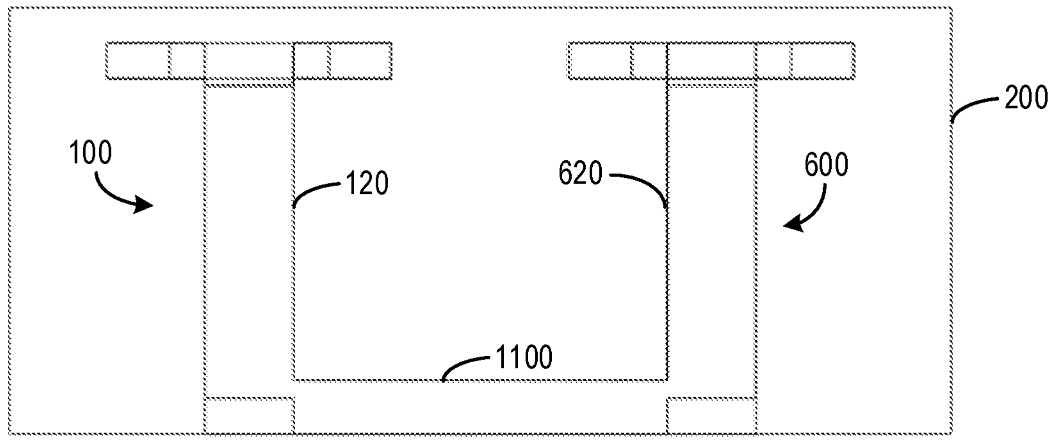
FIG. 11A illustrates a schematic diagram of two resonators with inductance metal sheets interconnected via an interconnection metal sheet according to an example embodiment of the present disclosure.

In some example embodiments, the magnetic coupling between the first resonator 100 and the second resonator 600 may be strengthened, to increase the operation bandwidth of the filter 500. FIG. 11A illustrates a schematic diagram of the two resonators 100 and 600 with the inductance metal sheets 120 and 620 interconnected via an interconnection metal sheet 1100, according to an example embodiment of the present disclosure. As shown in FIG. 11A, the interconnection metal sheet 1100 is provided between the first inductance metal sheet 120 of the first resonator 100 and the second inductance metal sheet 620 of the second resonator 600. With the interconnection via the interconnection metal sheet 1100, the magnetic coupling between the first resonator 100 and the second resonator 600 is strengthened, thereby increasing the operation bandwidth of the filter 500.

Figure 11B:
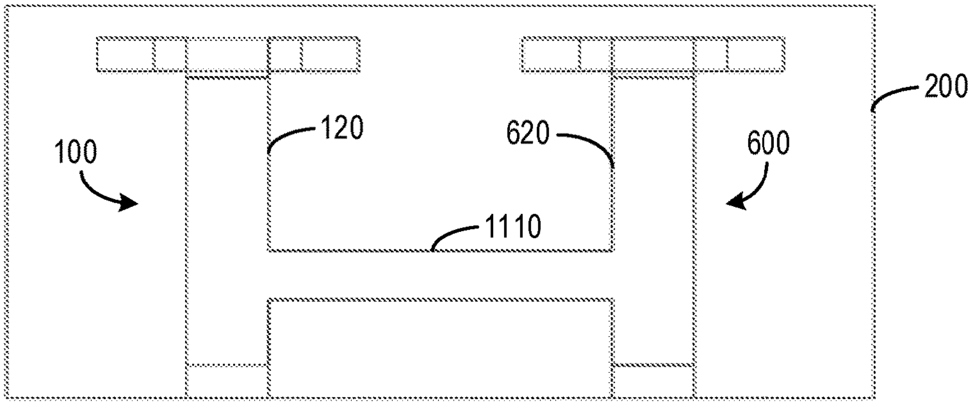
FIG. 11B illustrates a schematic diagram of two resonators with inductance metal sheets interconnected via another interconnection metal sheet according to an example embodiment of the present disclosure.

FIG. 11B illustrates a schematic diagram of the two resonators 100 and 600 with the inductance metal sheets 120 and 620 interconnected via another interconnection metal sheet 1110, according to an example embodiment of the present disclosure. In FIG. 11B, the first inductance metal sheet 120 of the first resonator 100 and the second inductance metal sheet 620 of the second resonator 600 are interconnected via an interconnection metal sheet 1110, in a similar manner as shown in FIG. 11A. The difference from FIG. 11A is that the interconnection metal sheet 1110 is arranged at a higher position than the interconnection metal sheet 1100. In this way, besides the strengthened magnetic coupling between the two resonators 100 and 600, the whole mechanical strength of the two resonators 100 and 600 can also be enhanced.

Figure 12A:
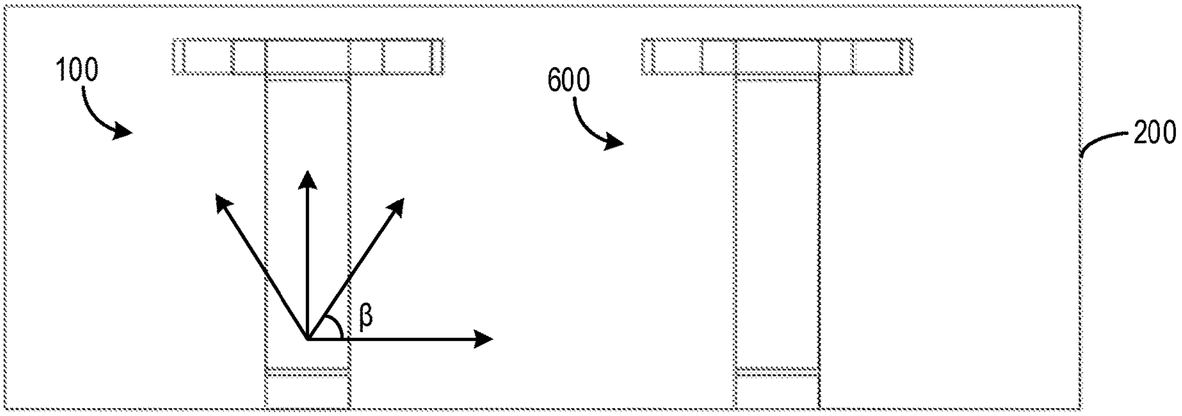
FIG. 12A illustrates a schematic diagram of adjusting a tilt angle of a first resonator towards a second resonator according to an example embodiment of the present disclosure.

FIG. 12A illustrates a schematic diagram of adjusting a tilt angle β of the first resonator 100 towards the second resonator 200, according to an example embodiment of the present disclosure. As shown in FIG. 12A, the tilt angle (which is also referred to as a rotation angle) β of the first resonator 100 towards the second resonator 600 may be used to adjust the coupling coefficient between the first resonator 100 and the second resonator 600, namely, the coupling strength between the two resonators, including the electric coupling coefficient and the magnetic coupling coefficient. Further description will be provided below with reference to simulation graphs of FIGS. 12B and 12C.

Figure 12B:
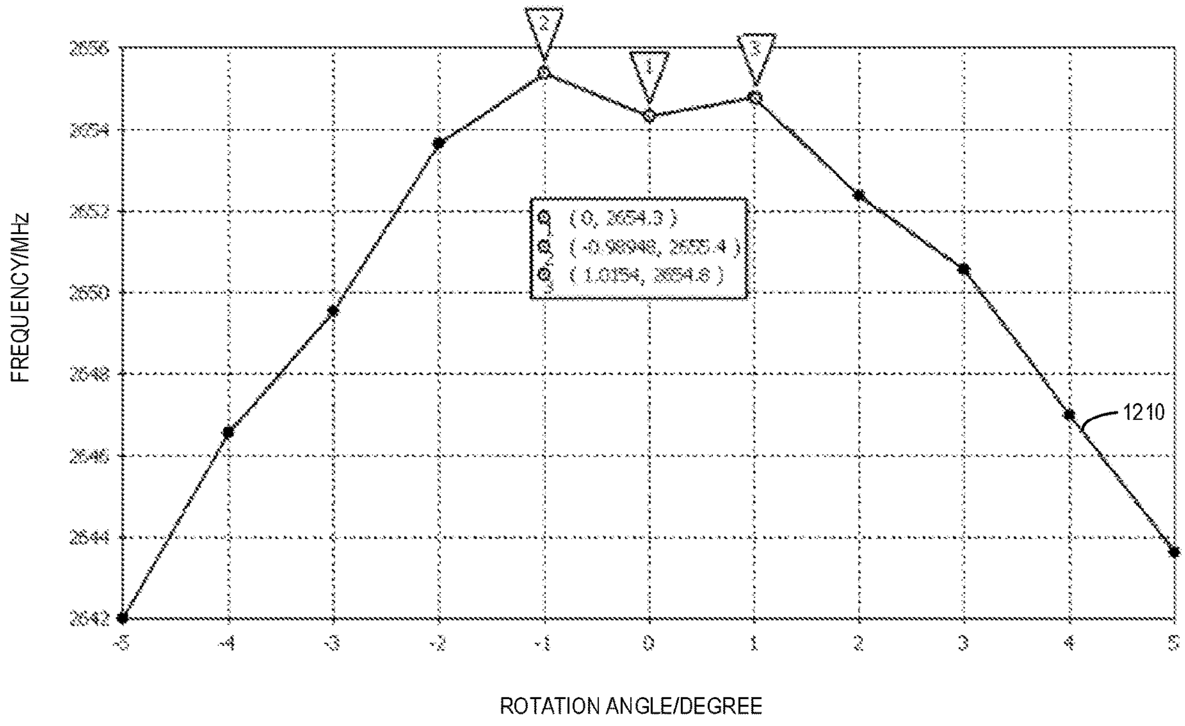
FIG. 12B illustrates a simulation graph of a coupling bandwidth varying with the angle adjusted as shown in FIG. 12A according to an example embodiment of the present disclosure.

FIG. 12B illustrates a simulation graph of a coupling bandwidth varying with the angle β adjusted as shown in FIG. 12A, according to an example embodiment of the present disclosure. In FIG. 12B, the horizontal axis represents the magnitude of the rotation angle β relative to the vertical direction in degree, and the horizontal axis represents the resonant frequency of the first resonator 100 in megahertz (MHz). As shown by a changing curve 1210 in FIG. 12B, a change in the rotation angle β has little impacts on the resonant frequency, for example, a change of one degree only results in a change of about 3 MHz in the resonant frequency. In other words, an adjustment of the rotation angle β does not substantially affect the resonant frequency of an individual resonator (which is the first resonator 100 in this example). On the other hand, a change in the rotation angle β significantly impacts the strength of coupling between the first resonator 100 and the second resonator 600, which will be explained with reference to FIG. 12C.

Figure 12C:
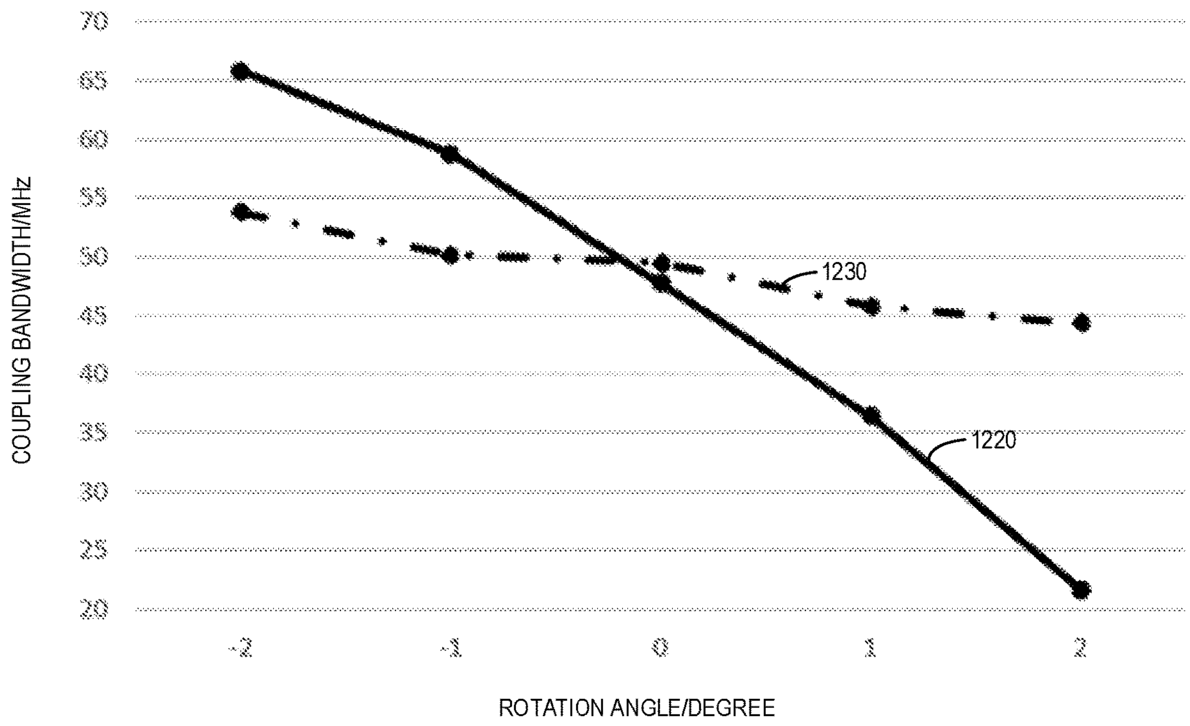
FIG. 12C illustrates a simulation graph of a coupling bandwidth varying with angles of a resonator when the angles are adjusted in two directions, respectively, according to an example embodiment of the present disclosure.

FIG. 12C illustrates a simulation graph of a coupling bandwidth varying with angles (α and β) of the resonator 100 when the angles (α and β) are adjusted in two directions, respectively, according to an example embodiment of the present disclosure. In FIG. 12C, the horizontal axis represents the magnitude of the rotation angles relative to the vertical direction in degree, and the vertical axis represents a coupling bandwidth (the coupling coefficient×the frequency) between the first resonator 100 and the second resonator 600. Since the coupling coefficient is dimensionless, the unit of the coupling bandwidth is the unit of the frequency, megahertz (MHz). The coupling bandwidth can represent the strength of coupling between two resonators at a certain frequency. As shown in FIG. 12C, a curve 1220 represents the coupling bandwidth between the first resonator 100 and the second resonator 600 varying with the rotation angle β as described above. In contrast, a curve 1230 represents the coupling bandwidth between the first resonator 100 and the second resonator 600 varying with the rotation angle α as described above.

It is seen from the curve 1220 that the coupling strength between the first resonator 100 and the second resonator 600 is varied significantly with the rotation angle (3, and as mentioned above, a change in the rotation angle β does not substantially affect the resonant frequency of an individual resonator. In contrast, as discussed above, a change in the rotation angle α impacts significantly the resonant frequency of an individual resonator; and it is seen from the curve 1230 that a change in the rotation angle α does not substantially affect the coupling strength between the first resonator 100 and the second resonator 600. For example, in terms of adjusting the coupling strength, the tuning rate of the rotation angle β is about five times as great as that of the rotation angle α.

In other words, the resonant frequency of a resonator and the coupling strength between resonators, according to an example embodiment of the present disclosure, can be adjusted independently, that is, the two have a weak correlation. This is quite helpful for tuning the whole filter 500, because the resonant frequency of an individual resonator and the coupling strength between resonators may be adjusted independently by means of the above-described two rotation angles. For example, such tuning may be performed through the tuning hole 206 as described above.

Figure 13A:
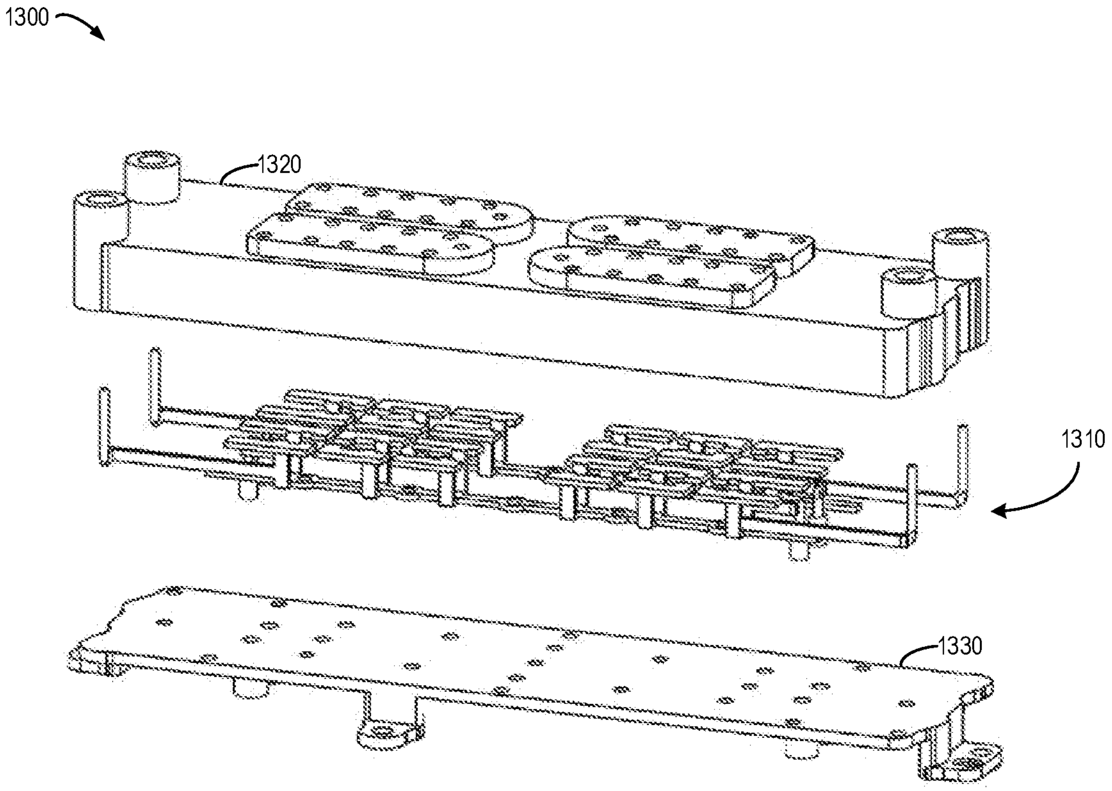
FIG. 13A illustrates a schematic diagram of a filter bank according to an example embodiment of the present disclosure.

FIG. 13A illustrates a schematic diagram of a filter bank 1300 according to an example embodiment of the present disclosure. The filter bank 1300 may be an application of an example embodiment of the present disclosure in a particular scenario, for example, a filter bank designed for a particular frequency (such as 3.5 GHz). As shown in FIG. 13A, the filter bank 1300 may include a resonator array 1310, a metal cavity 1320 and a lid 1330. The resonator array 1310 may be a 2×2 filter matrix, and each filter includes six resonators. All the resonators can be connected to the same mounting metal sheet to form two filter pipes. Moreover, tuning holes may be arranged on the metal cavity 1320 for tuning individual resonators in the resonator array 1310.

Figure 13B:
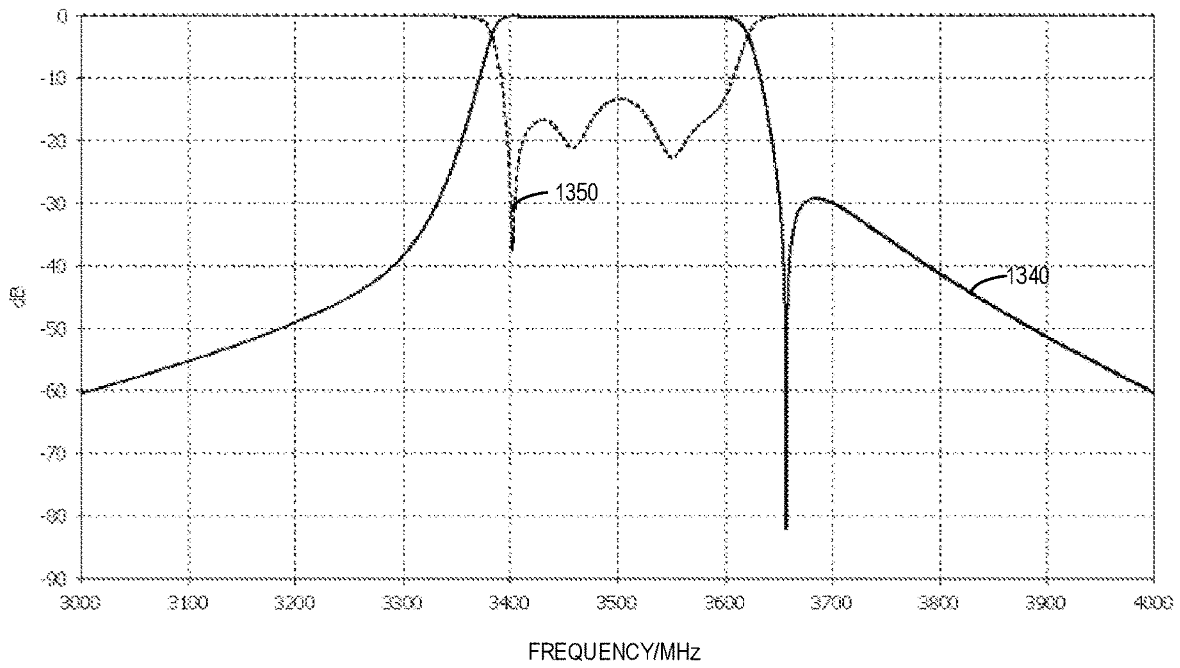
FIG. 13B illustrates a performance simulation graph of the filter bank of FIG. 13A according to an example embodiment of the present disclosure.

FIG. 13B illustrates a performance simulation graph of the filter bank 1300 of FIG. 13A, according to an example embodiment of the present disclosure. In particular, FIG. 13B illustrates a response curve of the filter bank 1300 within its passband. In FIG. 13B, the horizontal axis represents the frequency in megahertz (MHz), and the vertical axis represents the magnitude in decibels (dB). A curve 1340 represents an S21-parameter of the filter bank 1300, namely, a transmission coefficient. A curve 1350 represents an S11-parameter of the filter bank 1300, namely, a reflection coefficient. As shown in FIG. 13B, the insertion loss performance of the filter bank 1300 is very good, which is about 1 dB at the edge of the passband, and about 0.5 dB in the middle of the passband.

Figure 13C:
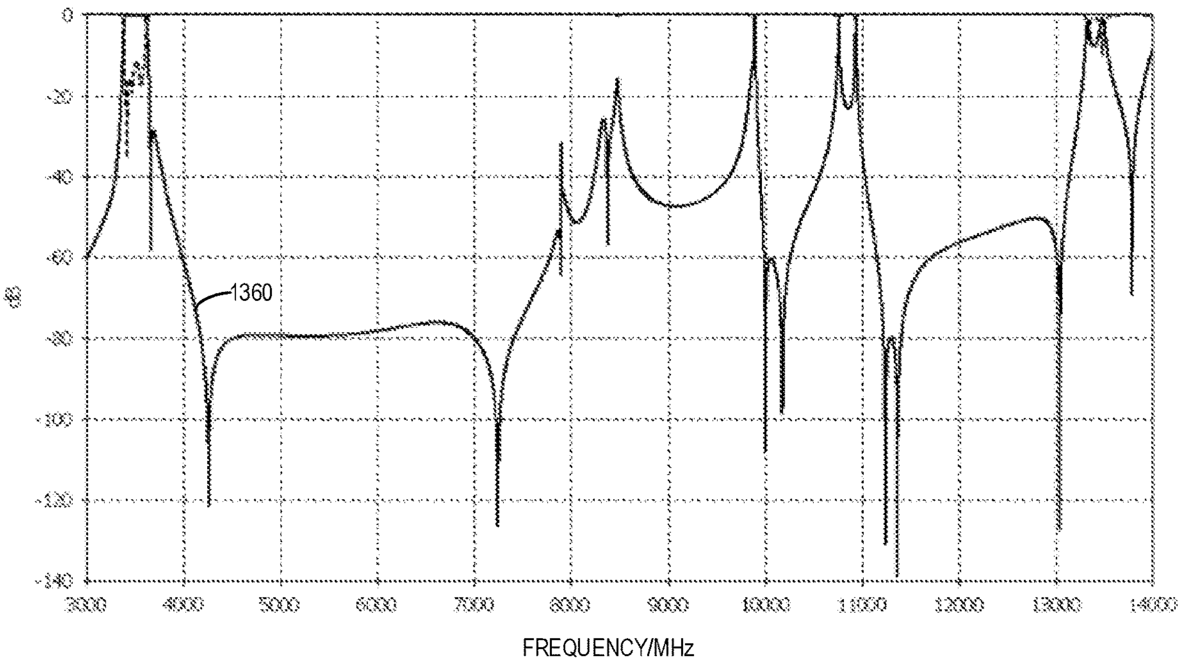
FIG. 13C illustrates another performance simulation graph of the filter bank of FIG. 13A according to an example embodiment of the present disclosure.

FIG. 13C illustrates another performance simulation graph of the filter bank 1300 of FIG. 13A, according to an example embodiment of the present disclosure. In particular, FIG. 13C illustrates an attenuation curve 1360 of the filter bank 1300 up to 14 GHz. In FIG. 13C, the horizontal axis represents the frequency in megahertz (MHz), and the vertical axis represents the magnitude in decibels (dB). As shown in FIG. 13C, the first high mode of the filter bank 1300 is at 9.3 GHz, having an attenuation of about 25 dB, and the worst point is at 11.68 GHz, having an attenuation of about −7 dB. It is seen from the performance simulation curves of FIGS. 13B and 13C, the filter bank 1300 according to an example embodiment of the present disclosure achieves a good filter performance.

Figure 14A:
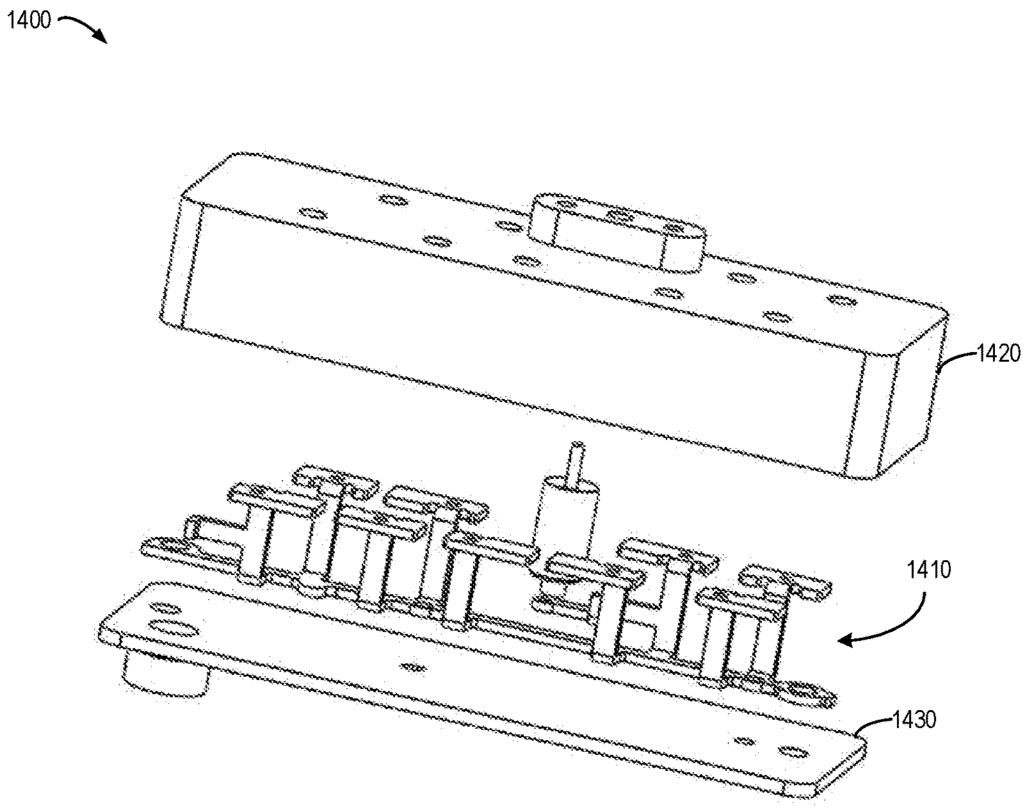
FIG. 14A illustrates a schematic diagram of a filter including a resonator array formed by nine resonators according to an example embodiment of the present disclosure.

FIG. 14A illustrates a schematic diagram of a filter 1400 including a resonator array 1410 formed by nine resonators, according to an example embodiment of the present disclosure. The filter 1400 can be an application of an embodiment according to the present disclosure in a particular scenario, for example, a filter designed for a particular frequency (for example, 2.6 GHz). As shown in FIG. 14A, the filter 1400 may include a resonator array 1410, a metal cavity 1420 and a lid 1430. The resonator array 1410 may be formed by nine resonators according to an example embodiment of the present disclosure. In addition, tuning holes may be arranged on the metal cavity 1420 for tuning individual resonators in the resonator array 1410.

Figure 14B:
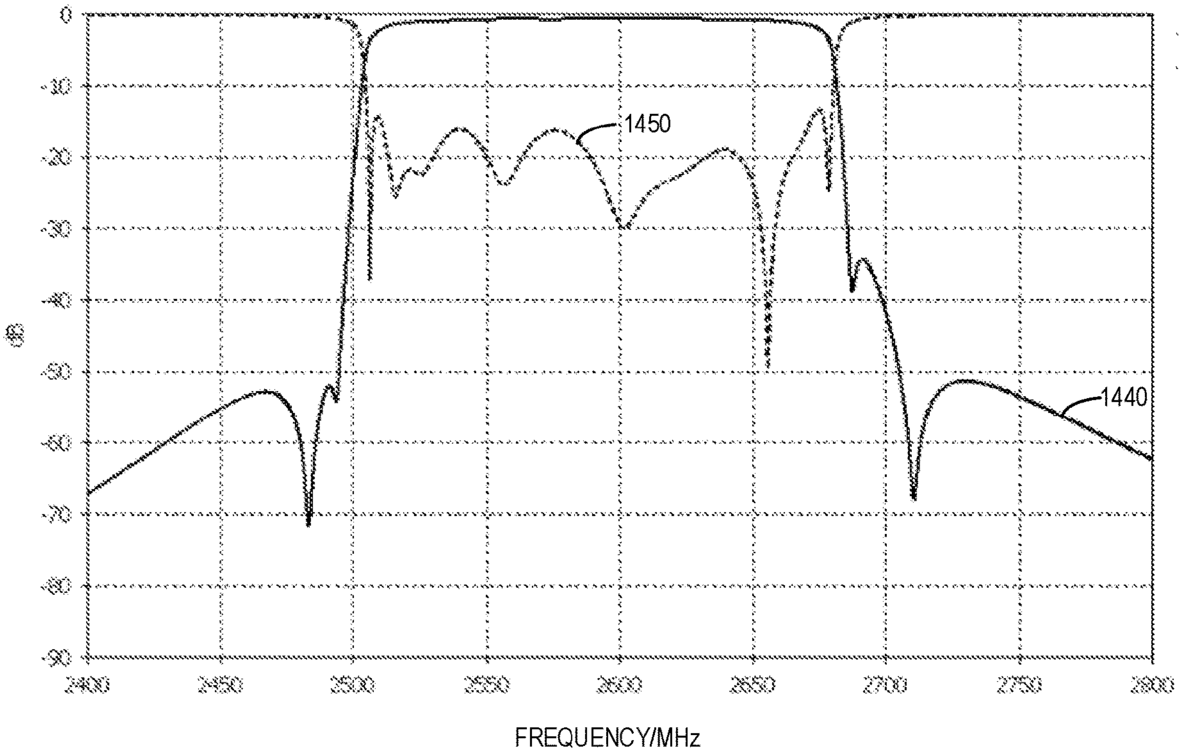
FIG. 14B illustrates a performance simulation graph of the filter of FIG. 14A according to an example embodiment of the present disclosure.

FIG. 14B illustrates a performance simulation graph of the filter 1400 of FIG. 14A, according to an example embodiment of the present disclosure. In FIG. 14B, the horizontal axis represents the frequency in megahertz (MHz), and the vertical axis represents the magnitude in decibels (dB). The curve 1440 represents an S21-parameter of the filter 1400, namely, the transmission coefficient. The curve 1460 represents an S11-parameter of the filter 1400, namely, the reflection coefficient. As shown in FIG. 14B, the filter 1400 according to an example embodiment of the present disclosure achieves good filter performance at the operation frequency 2.6 GHz.

As used herein, the term "includes" and its variants are to be read as open terms that mean "includes, but is not limited to." The term "based on" is to be read as "based at least in part on." The term "one example embodiment" and "the example embodiment" are to be read as "at least one embodiment." The terms "first," "second," and the like may refer to different or same objects. Other definitions, explicit and implicit, may be included herein.

As used herein, the term "determining" covers various acts. For example, "determining" may include operation, calculation, process, derivation, investigation, search (for example, search through a table, a database or a further data structure), identification and the like. In addition, "determining" may include receiving (for example, receiving information), accessing (for example, accessing data in the memory) and the like. Further, "determining" may include resolving, selecting, choosing, establishing and the like.

The term "circuit" herein refers to one or more of the following: (a) a hardware circuit-only implementation (for example, an implementation of only an analog and/or digital circuit); (b) a combination of a hardware circuit and software, such as, (if applicable): (i) a combination of an analog and/or digital hardware circuit and software/firmware, and (ii) any part of a hardware processor and software (including a digital signal processor, software and a memory operating together to enable devices, such as OLT or other computing apparatus, to execute various functions); and (c) a hardware circuit and/or a processor, such as a microprocessor or a part of a microprocessor, which requires software (for example, firmware) for operation, but may not include software if software is not required for operation.

The definition of the circuit is applicable to all use scenarios in the present disclosure (including any one of the claims). As a further example, the term "circuit" herein also covers only a hardware circuit or processor (or a plurality of processors), or a part of a hardware circuit or processor, or an implementation in which it is attached to software or firmware. For example, if applicable to a particular element in the claims, the term "circuit" also encompasses a baseband integrated circuit, or processor integrated circuit, or OLT, or a similar integrated circuit in other computing apparatus.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or special purpose hardware. Those skilled in the art would appreciate that the above apparatus and method may be implemented with computer executable instructions and/or in processor-controlled code, and for example, such code is provided on a carrier medium such as a programmable memory or an optical or electronic signal bearer.

As an example, the embodiments of the present disclosure can be described in the context of the machine executable instruction which is included, for example, in a program module executed in a device on a target physical or virtual processor. Generally, the program module includes a routine, program, library, object, class, component, data structure and the like, which executes a particular task or implement a particular abstract data structure. In various embodiments, the functions of the program modules can be merged or split among the program modules described herein. A machine executable instruction for a program module can be executed locally or within a distributed device. In a distributed device, a program module can be located in both of a local and a remote storage medium.

Program code for carrying out methods of the present disclosure may be written in any combination of one or more programming languages. The program code may be provided to a processor of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, computer program code or related data can be carried by any appropriate carrier, such as an apparatus, device or processor can execute various processing and operations as described above. The example of the carrier includes a signal, a computer readable medium and the like. The example of the signal may include a signal broadcast electrically, optically, wirelessly, acoustically or in other forms, such as a carrier, an infrared signal and the like.

A computer readable medium may be any tangible medium that may contain, or store a program for use by or in connection with an instruction execution system, apparatus or device. The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It would be appreciated that features and functions of two or more devices according to the present disclosure can be implemented in combination in a single implementation. Conversely, various features and functions that are described in the context of a single implementation may also be implemented in multiple devices.

Although the present disclosure has been described with reference to various embodiments, it should be understood that the present disclosure is not limited to the disclosed example embodiments. The present disclosure is intended to cover various modifications and equivalent arrangements included in the spirit and scope of the appended claims.

What is claimed is:

1. A resonator, comprising:

a first metal sheet configured to generate capacitance of the resonator with a first surface of a metal cavity for housing the resonator;

a second metal sheet configured to generate inductance of the resonator, the second metal sheet-being connected to the first metal sheet and extending to a second surface of the metal cavity; and a third metal sheet connected to the second metal sheet and configured to mount the resonator in the metal cavity, wherein the first metal sheet, the second metal sheet, and the third metal sheet are separate metal sheets that are integrally connected to each other.

2. The resonator of claim 1, wherein:

the first metal sheet has a rectangular shape; and the second metal sheet and the third metal sheet have a shape of a strip.

3. The resonator of claim 1, wherein:

the first metal sheet is substantially parallel to the first surface of the metal cavity; and the second metal sheet extends substantially perpendicular to the first metal sheet.

4. The resonator of claim 1, further comprising:

a metal bend extending from an edge of the first metal sheet towards the second surface of the metal cavity.

5. The resonator of claim 1, wherein notches are provided at two sides of a joint between the first metal sheet and the second metal sheet.

6. The resonator of claim 1, wherein an angle (a) between the second metal sheet and the second surface of the metal cavity within a reference plane is adjusted to tune a resonant frequency of the resonator, the reference plane being perpendicular to the first metal sheet and the second metal sheet.

7. The resonator of claim 1, wherein the first metal sheet, the second metal sheet and the third metal sheet are integrally formed.

8. The resonator of claim 1, wherein the first surface and the second surface are the opposite surfaces of the metal cavity.

9. A filter, comprising:

the metal cavity; and a resonator array disposed in the metal cavity, wherein the resonator array comprises at least two resonators of claim 1.

10. The filter of claim 9, wherein the at least two resonators comprise a first resonator and a second resonator, and a metal sheet of the first resonator configured to mount the first resonator to the cavity and a metal sheet of the second resonator configured to mount the second resonator to the cavity are integrally formed as a single metal sheet.

11. The filter of claim 10, wherein:

the at least two resonators are disposed at two sides of the single metal sheet; or the single metal sheet surrounds the at least two resonators.

12. The filter of claim 9, wherein the at least two resonators comprise a first resonator and a second resonator, and a first distance between a metal sheet of the first resonator configured to generate capacitance of the first resonator and a metal sheet of the second resonator configured to generate capacitance of the second resonator provides an electric coupling coefficient between the first resonator and the second resonator.

13. The filter of claim 9, wherein the at least two resonators comprise a first resonator and a second resonator, and an interdigital structure formed between a metal sheet of the first resonator configured to generate capacitance of the first resonator and a metal sheet of the second resonator configured to generate capacitance of the second resonator.

14. The filter of claim 9, wherein the at least two resonators comprise a first resonator and a second resonator, and a second distance between a metal sheet of the first resonator configured to generate inductance of the first resonator and a metal sheet of the second resonator configured to generate inductance of the second resonator provides a magnetic coupling coefficient between the first resonator and the second resonator.

15. The filter of claim 9, wherein the at least two resonators comprise a first resonator and a second resonator, and a metal sheet of the first resonator configured to generate inductance of the first resonator and a metal sheet of the second resonator configured to generate inductance of the second resonator are interconnected via a fourth metal sheet.

16. The filter of claim 9, wherein the at least two resonators comprise a first resonator and a second resonator, and the first resonator is tilted by an angle (β) towards the second resonator to adjust an electric coupling coefficient and a magnetic coupling coefficient between the first resonator and the second resonator.

17. The filter of claim 9, further comprising:

a tuning hole disposed on a first surface of the metal cavity for tuning one of the at least two resonators.

* * * * *